June 27, 1961  W. WANIELISTA ET AL  2,989,893
DUAL-DRIVE FOCUSING SYSTEM FOR CAMERAS
Filed June 2, 1958  5 Sheets-Sheet 2

INVENTORS
Walter Wanielista
BY Leonard S. Florsheim, Jr.

ATTORNEYS

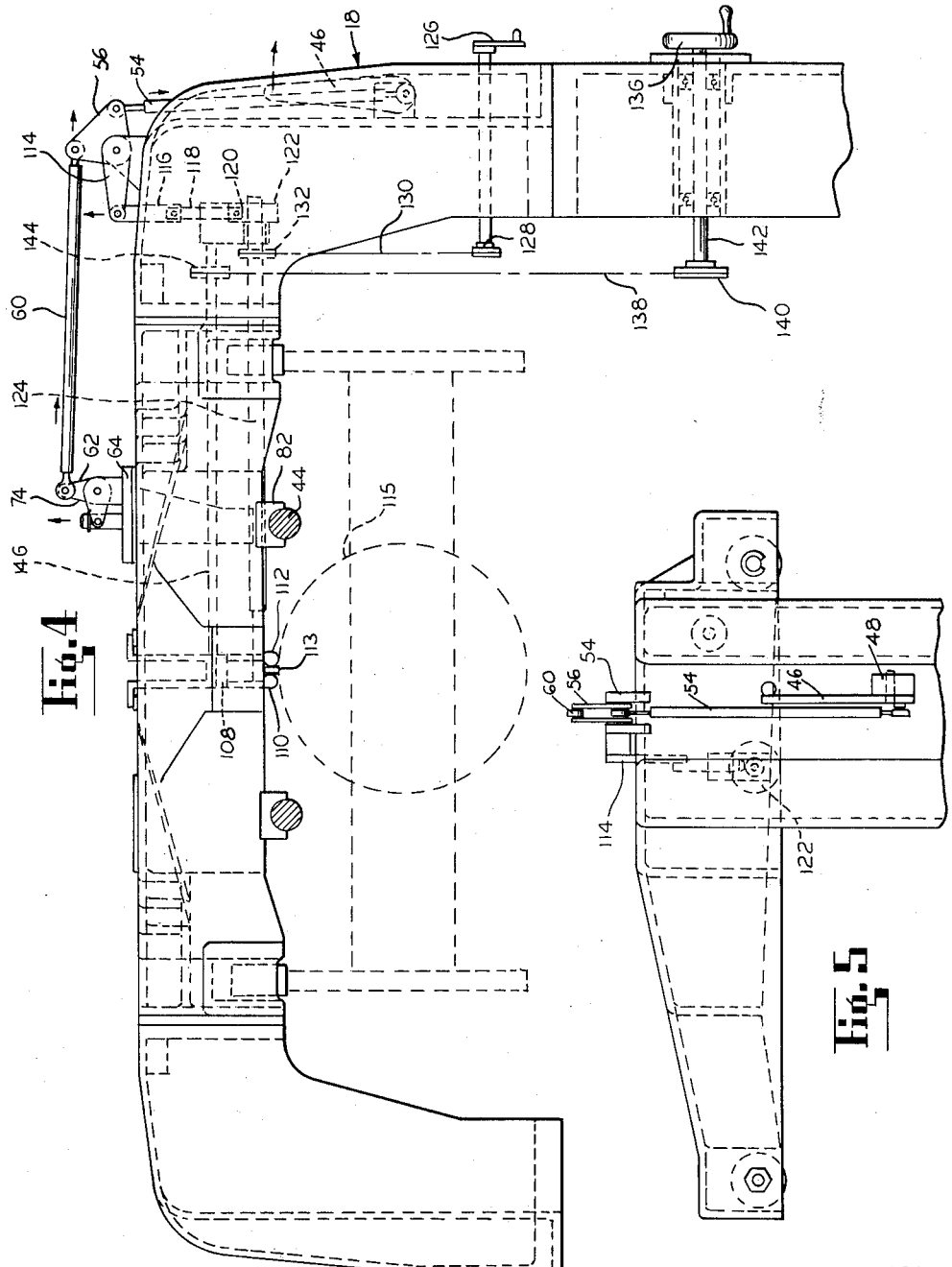

June 27, 1961 W. WANIELISTA ET AL 2,989,893
DUAL-DRIVE FOCUSING SYSTEM FOR CAMERAS
Filed June 2, 1958 5 Sheets-Sheet 4
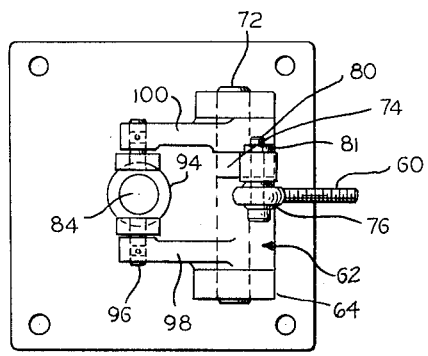
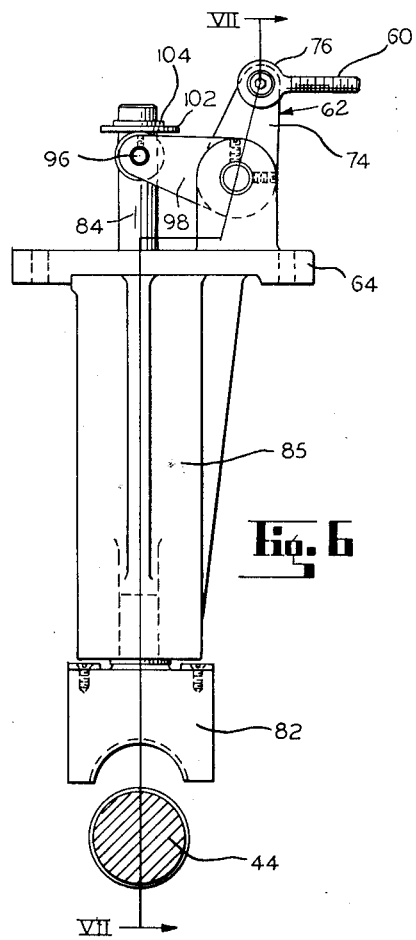
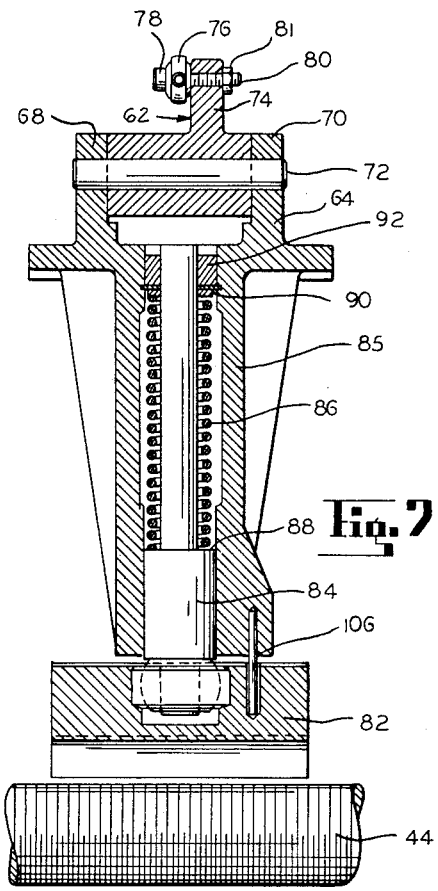
INVENTORS
Walter Wanielista
Leonard S. Florsheim, Jr.
BY
ATTORNEYS

United States Patent Office 2,989,893
Patented June 27, 1961

2,989,893
DUAL-DRIVE FOCUSING SYSTEM FOR CAMERAS
Walter Wanielista, Westchester, and Leonard S. Florsheim, Jr., Glencoe, Ill., assignors to Robertson Photo-Mechanix, Inc., Chicago, Ill., a corporation of Illinois
Filed June 2, 1958, Ser. No. 739,279
4 Claims. (Cl. 88—24)

This invention relates to a focusing system for cameras and more particularly to a focusing system wherein adjustment by cable means for volume production or adjustment by screw drive means for accuracy such as is required in color work, is afforded selectively, the screw drive adjustment means providing for resetting to a predetermined position and including means for preventing operation thereof and breaking the electrical circuit for the drive when the cable drive means is selected.

Heretofore, it has been necessary to provide two cameras for the purposes of volume production and precision photography respectively. The volume production has been accomplished by the use of a cable drive means wherein a manually operable crank system has afforded rapid movement to a desired focusing position while the screw drive means has utilized an electrically driven screw whose accuracy has been suitable for precision work. Obviously, the necessity for two cameras has involved great expense, loss of time and the use of a large amount of space.

The present invention overcomes these difficulties by means of a focusing system which permits instantaneous conversion from screw drive to cable drive, or vice versa, and achieves the advantages of both systems with the use of but one camera. If the operator contemplates the use of a precision operation such as color at some future date, he can operate effectively to produce volume work such as in black and white work until such time as the color operation is required and thereupon change instantly to the precision system. The forcusing system of the invention also affords extremely accurate re-registration to a predetermined screw drive position after manual operation has been completed. The means for accomplishing the aforementioned conversion from manual to electric drive or vice versa include a half-nut means which removably engages the screw drive means and is operatively connected with the copy board and lens board carriers of the camera. Lever means are provided for shifting the half-nut out of engagement with the screw and simultaneously releasing locking means for the cable drive so that manual operation is afforded, and manually operable locking means are provided for the screw drive which are also effective to open the circuit for the screw drive when the screw drive is locked against rotation and to close the circuit when the screw drive is released from a locked condition.

Accordingly, it is an object of the invention to provide a dual drive focusing camera which is effective in either volume of precision work selectively so as to accomplish work heretofore requiring two separate cameras.

Another object of the present invention is to provide a dual drive focusing system which permits the use of a screw drive for precision color work or the like, or the use of a cable drive for quick adjustment to volume black and white work or the like, selectively.

Another object of the invention is to provide a dual drive focusing system as described in which conversion from cable drive for volume production to screw drive for precision adjustment, or vice versa, may be accomplished substantially instantaneously by manually operable means requiring no particular training or skill in use.

Another object of the invention is to provide a system as described, in which indicator means are afforded for re-registering the screw drive in a predetermined setting upon completion of manual operation of the device.

Another object of the invention is to provide a camera in which manually operable safety means are provided whereby the screw drive circuit is opened and the screw is locked when the cable drive is in use, the safety means being readily releasable upon completion of cable drive operation to close the electric drive circuit and place the screw drive means in operative condition.

Other objects of the invention will become apparent as the description proceeds, in accordance with the drawings, in which:

FIGURE 4 is an end view of the C-board assembly of the invention;

FIGURE 5 is a side elevational view, partly broken away, of the C-board assembly shown in FIGURE 4;

FIGURE 6 is an end elevational view of the half-nut assembly of the invention for selective engagement and disengagement with the screw drive of the camera;

FIGURE 7 is a vertical sectional view taken through the line VII—VII of FIGURE 6;

FIGURE 8 is a top plan view of a bell crank portion of the half-nut assembly;

Figure 3:
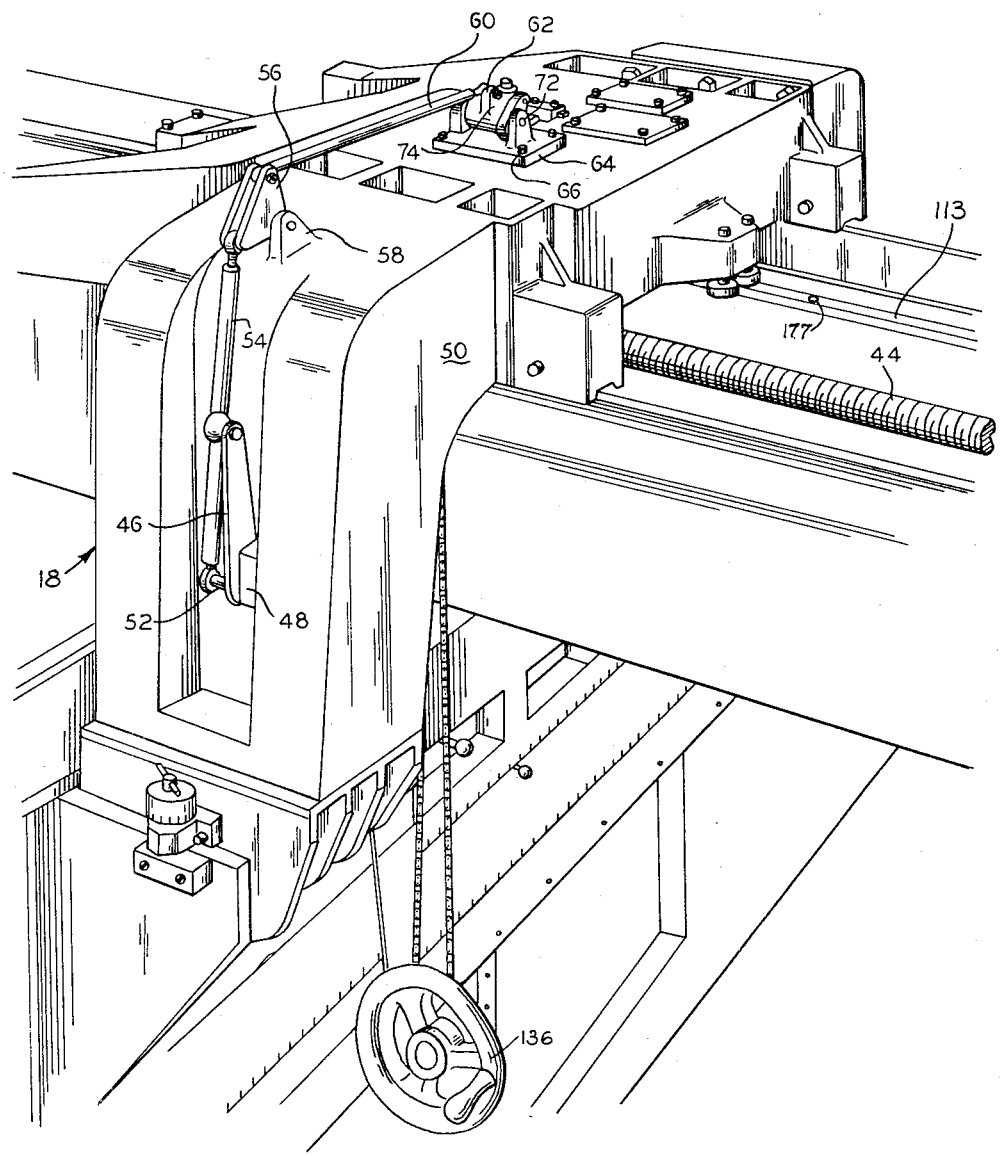
FIGURE 3 is a perspective view of the C-board carriage assembly of the camera disclosing lever means for selective engagement and disengagement of the screw drive.
Figure 1:
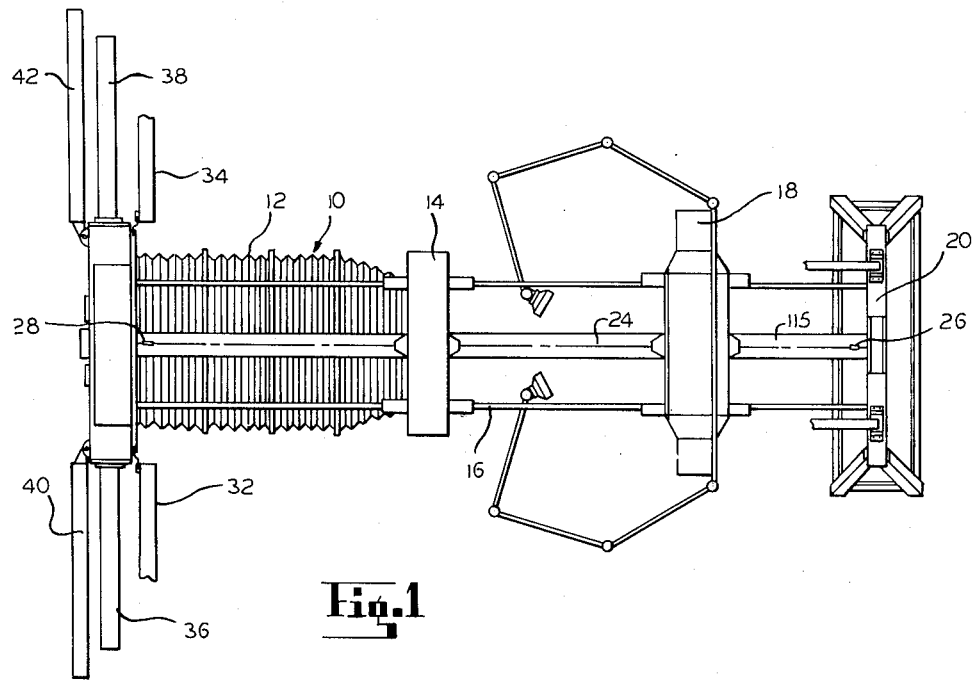
FIGURE 1 is a plan view of a camera according to the present invention.
Figure 2:
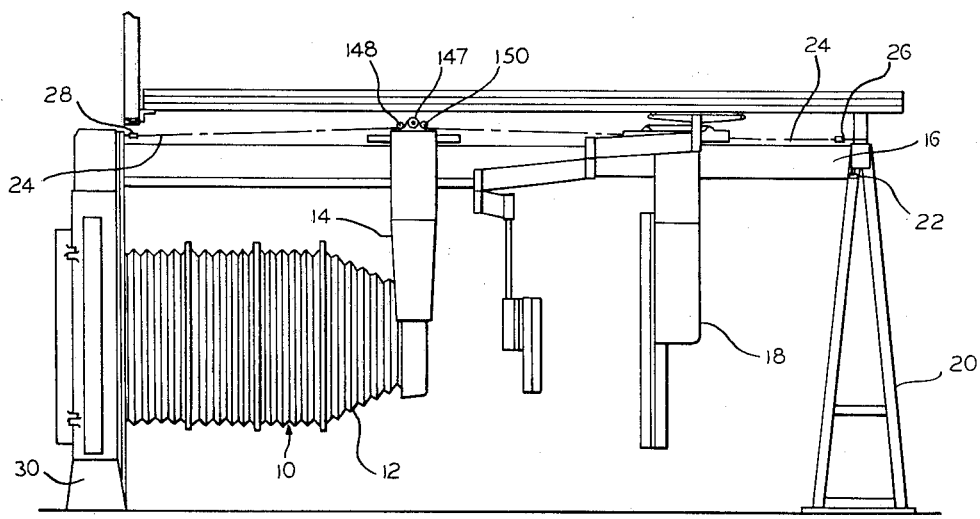
FIGURE 2 is a view corresponding to the view of FIGURE 1, wherein the camera of the system is seen in side elevation.

Referring now to FIGURES 1 and 2, a camera 10 is shown of the type for which the present invention is adapted and which includes a bellows 12, a lens carriage assembly 14 adapted to ride upon a track 16, a copy board assembly 18, also adapted to ride upon the track 16, a front support structure 20 for the track which carries a screw safety interlock 22 as hereinafter described, and a cable 24 secured by turnbuckle means 26 to the support 20 at its forward end and by similar turnbuckle means 28 to the back support section 30 of the camera 10, and associated structure is provided such as the dark room walls 32 and 34, means 36 and 38 by which screen side illumination can be obtained on either the left side or the right side or both, and pivotal panels 40 and 42, as readily understood by those skilled in the art.

Referring now to FIGS. 3–7, the "C-board" carriage assembly 18 is shown in association with a screw 44, and carries means for selectively engaging and disengaging the screw 44 as hereinafter further described, it being understood that similar means (not shown) are utilized for the lens carriage assembly 14. A shift lever 46 is journalled in a bracket 48 on the carriage casing 50, and carries an eccentrically mounted pin 52 pivotally connected to a shaft 54 which has its upper end similarly connected to a triangular link 56 rockably supported on a bracket 58 on the carriage casing 50. A second shaft 60 is pivotally connected at one end to the opposite end of the triangular link 54 and at its other end to a bell crank 62. The bell crank 62, as best seen in FIGURES 6 through 8, is pivotally mounted on the carriage casing 50 by means of a bracket 64 secured thereto by bolts 66, the bracket 64 providing upstanding trunnions 68 and 70 receiving a bell crank shaft 72. The shaft or rod 60 is secured to one end 74 of the bell crank 62 by a rod end bearing 76 on a bearing portion 78 of a bolt 80 which is secured in the bell crank 74 by a nut 81.

In order to afford selective threaded engagement of the screw 44 for precision drive actuation of the C-board carriage assembly 18, a half-nut assembly is provided which includes a relatively elongated half-nut member 82 carried by a half-nut shaft 84 which is slidably received in the bracket 64, and is biased downwardly by means of a spring 86, the bracket 64 having a depending bearing tube 85. The spring 86 bears on a shoulder 88 of the shaft 84 at its lower end and against a washer 90 and a bearing 92 at its upper end. The shaft 84 is received in a bearing 94 at its upper end which is held by a bell crank roller pin 96 on the arms 98 and 100 at the other end of the bell crank 62, the shaft 84 engaging the bearing 94 by means of a thrust washer 102 and the ring 104 engaged thereon. Thus, the half-nut 82 is mounted resiliently for precise, selective engagement with the screw 44, a roll pin 106 being received in the half-nut 82 and the lower end of the bearing tube 85 which affords axial movement of the half-nut 82 relative to the tube 85 to a slight extent. Accordingly, when the lever 46 is pulled downwardly from the position shown in FIGURE 3, the bell crank 62 will be rotated outwardly and will cause the bearing 94 to engage the thrust washer 102 to lift the shaft 84 and the half-nut 82 to the position shown in FIGURES 6 and 7. Reverse movement of the crank 46 will, correspondingly, move the half-nut 82 into engagement with the screw 44.

As hereinafter further described, means are provided for maintaining the cable drive in inoperative condition during operation of the screw drive, these means including a yoke 108 having clamping elements 110 and 112 for engaging a center rail 113 axially disposed on a center tube 115. The triangular link 54 has affixed thereto a lever 114, as seen in FIGURES 4 and 5, to which a shaft 116 is pivotally secured, carrying a pin 118 in axial alignment therewith. The shaft 116 may be guided by the carriage casing 50 and the pin 118 is adapted to be removably received in a recess 120 formed in a disk 122. The disk 122 is fixedly secured to a shaft 124 which is adapted to be rotated by means of a cable lock crank 126 which carries a sprocket 128. The sprocket 128 engages a chain 130, which passes around a corresponding sprocket 132 at its upper end and which is also fixedly secured to the shaft 124. Thus, when the half-nut 82 is in driving relationship with the shaft screw 44, the pin 118 is adapted to be received in the recess 120, and the shaft 124 threadedly holds elements 112 and 114 in locking relation to rail 113. However, when the crank 46 is moved outwardly to disengage the half-nut 82, the pin 118 is released from the locking recess 120 and the disk 122 and rotation of the crank 126 is effective to rotate the shaft 124 so that the yoke elements 110 and 112 disengage from the rail 113. Thereupon, a cable drive wheel 136, journalled in the carriage assembly 20, may be rotated so as to actuate a chain 138 which passes around a cable drive sprocket 140 affixed to the shaft 142 for the cable drive wheel 136, the chain 138 serving to rotate a sprocket 144 fixed upon a shaft 146 adapted as seen in FIG. 2 to rotate a pulley 147 in snug driving relation with a pair of idler rollers 148 and 150. The cable 24 passes around the rollers 148 and 150 in a manner such that upon rotation of the pulley 147 and idler rollers 148 and 150, the carriages 14 or 18 are moved relative to the cable (similar means being provided for each of the said carriages as stated), sealing being accomplished by suitable percentage tape (not shown) in accordance with the understanding of those skilled in the art. The lever 126 may be rotated in the reverse direction when precision work calls for the use of the screw drive 44, so that the clamps 110 and 112 are opened thereby permitting the pin 118 to engage in the disk 122 and in the appropriate recess 120 thereof when the lever 46 is moved inwardly as described in placing the half-nut 82 in engagement with the screw 44.

Figure 9:
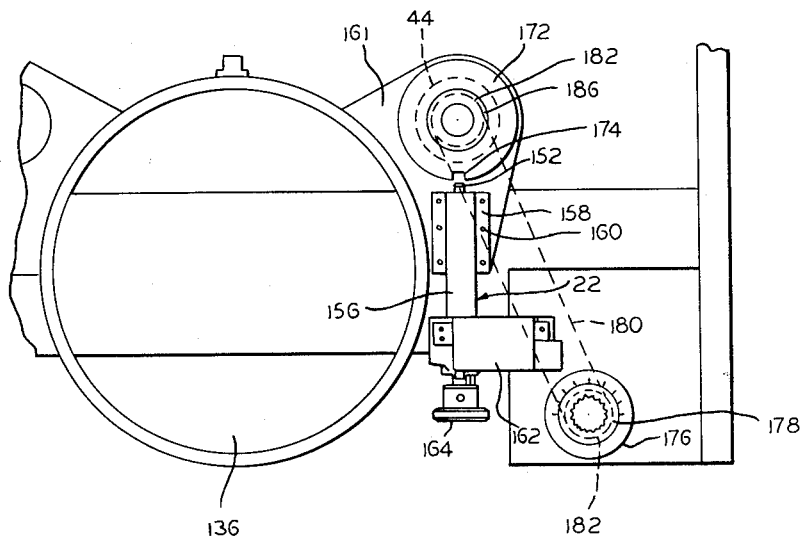
FIGURE 9 is an end view of the traverse screw interlock assembly of the invention which affords positioning of the screw in correct reading position while the cable drive is in use and which serves to lock the screw drive at such time.
Figure 10:
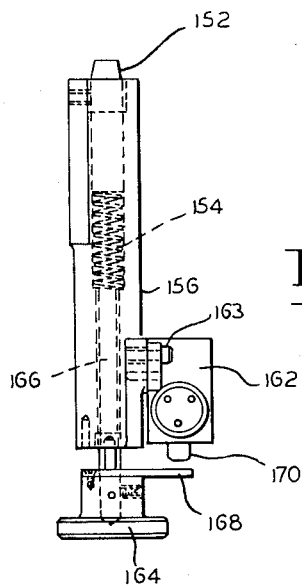
FIGURE 10 is an enlarged end elevational view of the plunger means of the interlock assembly of FIGURE 9 and FIGURE 10.

Referring now to FIGURES 9 and 10, means 22 are shown for locking the screw drive 44 when the carriage assembly 18 is being driven by the cable 24. These means include a plunger 152 biased upwardly by a spring 154 in a cylindrical retaining tube 156. The tube 156 is secured by bracket means 158 and bolts 160 upon a support element 161 and carries a microswitch unit 162 secured thereto by bolt means 163. The plunger 152 is adapted to be moved upwardly by means of a knob 164 and a shaft 166 secured thereto within the tube 156, the knob carrying a plate 168 which is adapted to engage a switch 170 to open the screw drive circuit when the plunger is moved upwardly. The plunger 152 is adapted to engage an interlock hub 172 when thus moved upwardly, the hub defining a recess 174 complementary to the end of the plunger. The interlock hub 172 is fixedly secured to the screw 44 so that upon engagement of the plunger 152 in the recess 174, the screw is held against rotation.

In order to provide for resetting of the screw 44 in a desired position upon completion of rapid adjustment manually by the cable means 24, a manually adjustable dial 176 is mounted on the carriage 18. The carriage is first returned to a position indicated by scribe lines on the track and the dial 176 is set to a predetermined reading. "Scribe lines" are conveniently provided, in effect, by a recess 177 in the center rail 113 (FIG. 3) adapted to receive a pin which will provide a stop for engagement with the carriage. The dial 176 carries a sprocket wheel 178 around which a chain 180 passes to transmit the setting to a corresponding sprocket wheel 182 on the hub 172, the plunger 152 being disengaged from the hub 172 at such time. Thereupon, the lever 46 is tripped to cause the nut 82 to engage the screw 44 as described, so that scaling may once again be accomplished by precise linear counters.

Other continuously ridged means such as rack and gear means, or the like, may be utilized within the concept of the invention to perform the function of the screw 44, and although we have herein set forth and described our invention with respect to certain specific principles and details thereof, it will be obvious that these may be varied without departing from the spirit and scope of the invention as set forth in the hereunto appended claims.

We claim as our invention:

1. In a dual drive focusing system for cameras or the like, an electrical circuit, a screw operated by said circuit, a carrier focusing means carrying a lens or a copy board or the like, track means supporting said carrier means, manually operable means carried by said carrier means for selective engagement with said screw for adjustment of said carrier means, manually operable plunger means, means carried by said screw adapted to removably receive said plunger means to selectively lock said screw, and microswitch means actuated by said plunger means for opening the circuit for said screw when said plunger means is engaged in locking relationship to said screw and for closing circuit means for said screw when said plunger means is in disengaged relationship to said screw.

2. In a camera having a carriage for carrying a lens or a copy board and a track supporting said carriage, a wheel carried by said carriage, an elongated member in engagement with said wheel mounted on said camera, means for manually rotating said wheel to move said carriage on said track, a rotatable screw parallel with said track, means on said carriage for selectively engaging said screw to move said carriage during rotation of said screw, means for moving said means on said carriage into or out of engagement with said screw, means preventing driving of said carriage by said wheel when said means on said carriage is in engagement with said screw, manually operable means for selectively locking said screw against rotation and releasing said screw and a switch for electrically starting and stopping rotation of said screw and means carried by said means for selectively locking and releasing said screw for actuating said switch.

3. In a camera having a carriage for carrying a lens or a copy board and a track supporting said carriage, a wheel carried by said carriage, an elongated member in engagement with said wheel mounted on said camera, means for manually rotating said wheel to move said carriage on said track, a rotatable screw parallel with said track, means on said carriage for selectively engaging said screw to move said carriage during rotation of said screw, means for moving said means on said carriage into or out of engagement with said screw, means preventing driving of said carriage by said wheel when said means on said carriage is in engagement with said screw, manually operable means for selectively locking said screw against rotation and releasing said screw and means for turning said screw to a desired extent for resetting thereof during a release condition of said manually operable means for selectively locking and releasing said screw including manually adjustable means on said carriage and means operated thereby for controlling said manually operable means for selectively locking and releasing said screw.

4. In a camera having carriage means for a lens or copy board or the like and a track for supporting said carriage means, a cable extending along said track, a rotatable member carried by said carriage means engageable with said cable, means for rotating said rotatable member to drive said carriage means along said track, a rotatable screw extending along said track, threaded means on said carriage means selectively engageable with said screw for driving said carriage means along said track when the screw is rotated, means for moving the threaded means into and out of engagement with said screw, means preventing driving of the carriage means by said rotatable member when the threaded means is in engagement with the screw, and means for locking the screw against rotation when the carriage is being driven by said rotatable member.

References Cited in the file of this patent
UNITED STATES PATENTS

| | | |
|---|---|---|
| 1,195,225 | Huebner | Aug. 22, 1916 |
| 1,452,077 | Huebner | Apr. 17, 1923 |
| 1,525,798 | Boedicker | Feb. 10, 1925 |
| 1,846,972 | Koppe | Feb. 23, 1932 |
| 1,847,010 | Koppe | Feb. 23, 1932 |
| 2,150,974 | Huebner | Mar. 21, 1939 |
| 2,420,023 | Wekeman | May 6, 1947 |
| 2,506,347 | Davis | May 2, 1950 |
| 2,655,834 | Pennington | Oct. 20, 1953 |
| 2,690,696 | Ashton | Oct. 5, 1954 |